United States Patent [19]
Kato

[11] Patent Number: 6,058,098
[45] Date of Patent: May 2, 2000

[54] HEAD DRIVING DEVICE

[75] Inventor: Kazunari Kato, Iwaki, Japan

[73] Assignee: Alpine Electronics, Inc., Japan

[21] Appl. No.: 09/025,599

[22] Filed: Feb. 18, 1998

[51] Int. Cl.[7] ............................. G11B 17/30; G11B 5/55
[52] U.S. Cl. .................... 369/219; 369/223; 369/244
[58] Field of Search .............................. 369/219, 244,
369/246; 360/106, 107; 74/409, 441, 424.8 A

[56] References Cited

U.S. PATENT DOCUMENTS

| | | | |
|---|---|---|---|
| 3,648,535 | 3/1972 | Maroth | 74/424.8 R |
| 3,703,835 | 11/1972 | O'Connor et al. | 74/441 |
| 3,895,543 | 7/1975 | Metzger et al. | 74/89.15 |
| 3,921,969 | 11/1975 | Hickey et al. | 271/3.14 |
| 3,969,768 | 7/1976 | Ebbing | 360/107 |
| 4,071,866 | 1/1978 | Butsch | 360/106 |
| 4,449,417 | 5/1984 | Sasaki | 74/409 |
| 5,063,557 | 11/1991 | Takamatsu et al. | 369/219 |
| 5,105,322 | 4/1992 | Steltzer | 360/106 |
| 5,304,024 | 4/1994 | Schuster | 411/418 |
| 5,448,438 | 9/1995 | Kasetty | 360/106 |
| 5,535,076 | 7/1996 | Kamioka et al. | 360/106 |
| 5,682,282 | 10/1997 | Kato | 360/106 |
| 5,739,983 | 4/1998 | Shigemoto | 360/106 |

*Primary Examiner*—David L. Ometz
*Assistant Examiner*—Angel Castro
*Attorney, Agent, or Firm*—Brinks Hofer Gilson & Lione

[57] ABSTRACT

The head driving device of the invention is provided with a head unit guided by a guide member, which is provided movably along a recording medium, a screw shaft provided along a moving direction of the head unit, a driving unit for giving a torque to the screw shaft, and a spirally engaging member supported by the head unit, which is spirally engaged with the screw shaft. In the this construction, the spirally engaging member is formed of a first engagement member supported by the head unit, which is engaged with the screw shaft, and a second engagement member engaged with the screw shaft at a position different from the position of the first engagement member, which keeps a relatively movable position with the first engagement member. Further the spirally engaging member is provided with an energizing member that gives suppression forces each having the opposite direction to the other in the axial direction of the screw shaft to the first engagement member and the second engagement member. With the head driving device thus constructed, the backlash generated between both the engagement members and the screw shaft will be absorbed without increasing the rotating load of the screw shaft.

21 Claims, 5 Drawing Sheets

HEAD DRIVING DEVICE

BACKGROUND OF THE INVENTION

1. Field of the Invention

The present invention relates to a device for driving a head unit that mounts a reproducing and/or recording head for reproducing and/or recording information from and/or on a recording medium such as the digital versatile disk (DVD) or compact disk (CD), particularly to a head driving device capable of reducing the backlash generated between the screw shaft and the head unit.

2. Description of the Related Art

Figure 6:
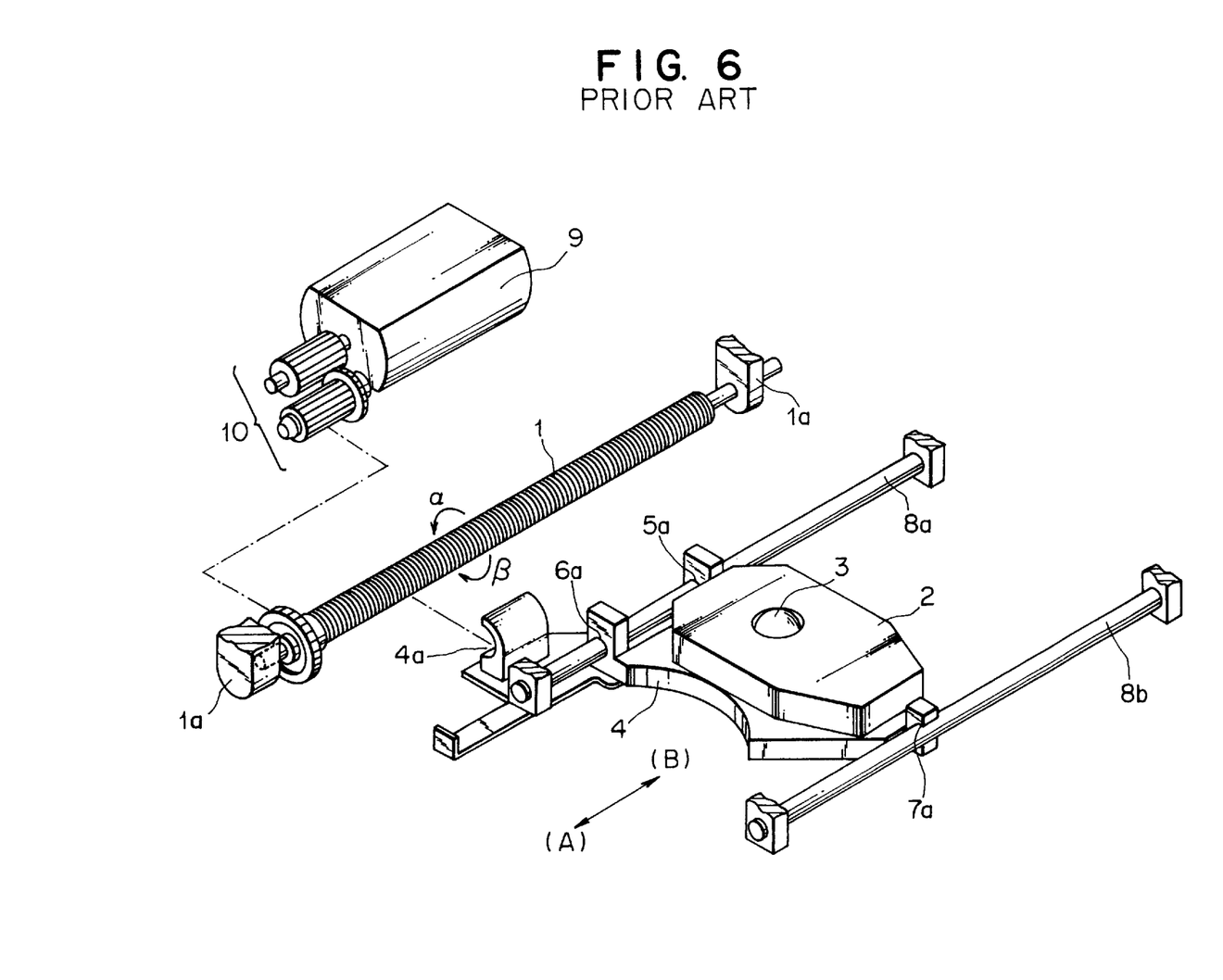
FIG. 6 is a perspective view illustrating a head driving device of a conventional optical head.

FIG. 6 is a perspective view of a device for driving an optical head mounted on a reproducing unit for a conventional compact disk (CD). In the head driving device shown in FIG. 6, an optical head 2 containing an objective lens 3 is guided by guide shafts 8a, 8b. A head base 4 that mounts the optical head 2 has shaft bearing holes 5a, 6a formed on one end of the base, and a guide shaft 8a is inserted through the shaft bearing holes 5a, 6a. The head base 4 has a U slot 7a formed on the other end thereof, and this U slot 7a is engaged horizontally slidably with the guide shaft 8a.

A screw shaft 1 is disposed in parallel to the guide 8a on the side of the guide 8a that is served as a reference for driving the head. The power of a tracking motor 9 is transferred to the screw shaft 1 to be reduced by reduction gears 10, which drives to rotate this screw shaft 1. The head base 4 is provided with a helically engaging member 4a of an internal thread. This helically engaging member 4a is engaged with the thread groove of the foregoing screw shaft 1. The helically engaging member 4a is made, for example, by the injection molding of a resin, etc., and is fastened to the head base 4. And, if the screw shaft 1 turns in a direction or b direction, this torque is transferred from the thread groove to the helically engaging member 4a as a driving force acting in the direction (A)-(B). Accordingly, the head base 4 and the optical head 2 is driven to move in the direction (A)-(B).

In FIG. 6, (A) direction faces the center of the disk (not illustrated), (B) direction faces the peripheral of the disk. The optical head 2 moves rectilinearly between the center part of the disk and the peripheral thereof, the objective lens 3 irradiates a detecting light to the disk, and a light receiving device inside the optical head 2 detects the reflected light from the disk, thus reading out an information signal recorded on the disk.

However, the foregoing head driving device has the problems as follows.

The screw shaft 1 presses the helically engaging member 4a to engage the internal thread formed on the helically engaging member with the thread of the screw shaft 1. Here, a backlash is produced in the engaged part in the axial direction of the screw shaft 1. The backlash is determined depending on the accuracy of engagement by the screw shaft 1 and the helically engaging member 4a. The screw shaft 1 is generally made through machining so that the thread is formed in a high precision. On the other hand, the helically engaging member 4a is usually made by the injection molding of a resin, so that the molding accuracy of the internal thread thereof cannot be enhanced sufficiently as desired. Consequently, there is a dispersion by each product as to the foregoing backlash.

Accordingly, a structure to reduce the backlash generated by the helically engaging member 4a and the screw shaft 1 is required. In the conventional art, the helically engaging member 4a is suppressed to the screw shaft 1 in the direction perpendicular to the axial center of the screw shaft 1 by a spring.

However, this suppression force is extremely difficult to set as appropriate. For example, if the helically engaging member 4a is suppressed with an excessive force toward the axial center of the screw shaft 1, the rotating load of the screw shaft 1 becomes extremely high, since both the ends of the screw shaft 1 are strongly pressed to the shaft bearings 1a in the diametral direction of the shaft. And, the sliding frictional resistance between the helically engaging member 4a and the screw shaft 1 becomes increased as well. Accordingly, the load of the tracking motor 9 is increased, which increases the consumption power. Further, the increased load advances wearing on the shaft bearing 1a, and it will give a possibility of generating a looseness between the screw shaft 1 and the shaft bearing 1a to obstruct a high-precision head driving. Further, since the suppression force to the helically engaging member 4a acts only in the axial direction of the screw shaft 1, the wearing on the internal thread of the helically engaging member 4a increases the backlash to that extent.

On the other hand, if the force to suppress the helically engaging member 4a to the screw shaft 1 is too low, it cannot reduce the backlash. In addition, when an excessive acceleration acts on the head base 4 in the axial direction of the screw shaft 1, there is a possibility that the helically engaging member 4a and the screw shaft 1 fall off from the engagement, and the helically engaging member 4a slides the location in the axial direction of the screw shaft 1. Especially, the optical head mounted on the reproduction unit for the digital versatile disk (DVD) has a great weight, which makes easier to fall off from the engagement when an external impact acts on the head.

From the reason described above, the force to suppress the helically engaging member 4a to the screw shaft 1 has to be set aiming at an intermediate point of such a colliding condition that is not too low and not too high. However, a spring member such as a coil spring is difficult to set such a subtle suppression force. And, it is also necessary to vary the suppression force in correspondence with the dispersion of the molding accuracy of the helically engaging member 4a. Also from this point of view, it is extremely difficult to set an appropriate suppression force.

SUMMARY OF THE INVENTION

The present invention intends to solve the foregoing problems in the conventional technique, and it is an object of the invention to provide a head driving device that is not subjected to the molding accuracy of the helically engaging member and securely reduces the backlash generated between the helically engaging member and the screw shaft.

In order to accomplish the foregoing object, the head driving device of the invention is provided with a head unit guided by a guide member, which is provided movably along a recording medium, a screw shaft provided along a moving direction of the head unit, a driving unit for giving a torque to the screw shaft, and a spirally engaging member supported by the head unit, which is spirally engaged with the screw shaft. In the foregoing construction, the spirally engaging member is formed of a first engagement member supported by the head unit, which is engaged with the screw shaft, and a second engagement member engaged with the screw shaft at a position different from the position of the first engagement member, which keeps a relatively movable position with the first engagement member. Further the spirally engaging member is provided with an energizing member for giving suppression forces each having the opposite direction to the other in the axial direction of the screw shaft to the first engagement member and the second engagement member.

According to the invention described above, the first engagement member and the second engagement member are energized in the opposite direction to each other, and both the engagement members are suppressed to the thread of the screw shaft in the axial direction of the screw shaft; and thereby, the backlash generated between both the engagement members and the screw shaft is absorbed. Therefore, an excessive lateral pressure perpendicular to the axial center of the screw shaft is not necessary to be applied thereto, the screw shaft is not pressed to the bearings, and thereby, the rotating load of the screw shaft does not increase. Further, if the engagement member is worn, the engagement member continues to be suppressed to the thread of the screw shaft in the axial direction thereof by the energizing member. Therefore, the wearing on the engagement member will not increase the backlash.

The foregoing first engagement member and the second engagement member are placed to face each other on both the sides of the screw shaft. The facing distance between both the engagement members is preferably set to a dimension whereby the engagement by the screw shaft and the engagement members does not fall off. The first engagement member and the second engagement member thus constructed will not fall off from the engagement with the screw shaft, and the head unit will not move in the axial direction of the screw shaft. In addition, setting the facing distance between both the engagement members to an appropriate dimension will not increase the rotating load of the screw shaft. Especially, the structure in which the first engagement member supports the second engagement member favors to appropriately set the facing distance between both the engagement members in relation with the diameter of the screw shaft.

Further, the structure may be designed such that the second engagement member is rotatably supported by a spindle provided on the first engagement member, perpendicular to the axial direction of the screw shaft, and the energizing member gives a relative rotating force between the first engagement member and the second engagement member. And, it is possible to dispose the first engagement member and the second engagement member in a narrow thin space, by designing the extension of the center line of the spindle to intersect the axial center of the screw shaft.

Further, the first engagement member is preferably suppressed to the screw shaft in the axial direction. The suppression force is applied, for example, by a blade spring.

In the structure that the second engagement member is supported by the first engagement member, to suppress the first engagement member to the screw shaft will further reduce the backlash between the engagement members and the screw shaft. However, the backlash between both the engagement members and the screw shaft are reduced, by the first engagement member and the second engagement member energized in the opposite direction to each other along the axial direction of the screw shaft. In addition, the engagement by both the engagement members and the screw shaft becomes difficult to fall off, by appropriately setting the facing distance between the first and second engagement members. Therefore, it is not necessary to increase a force to suppress the first engagement member in the axial direction of the screw shaft. Accordingly, the rotating load of the screw shaft will not increase by a lateral pressure whereby the first engagement member is suppressed to the screw shaft.

Further, the first engagement member and the second engagement member may be provided with multiple convex threads to engage with the thread of the screw shaft. However, as shown in the drawing, two convex threads may be formed on each of the engagement members, or even one may be formed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Preferred embodiments of the present invention will hereafter be described with reference to the accompanying drawings.

Figure 1:
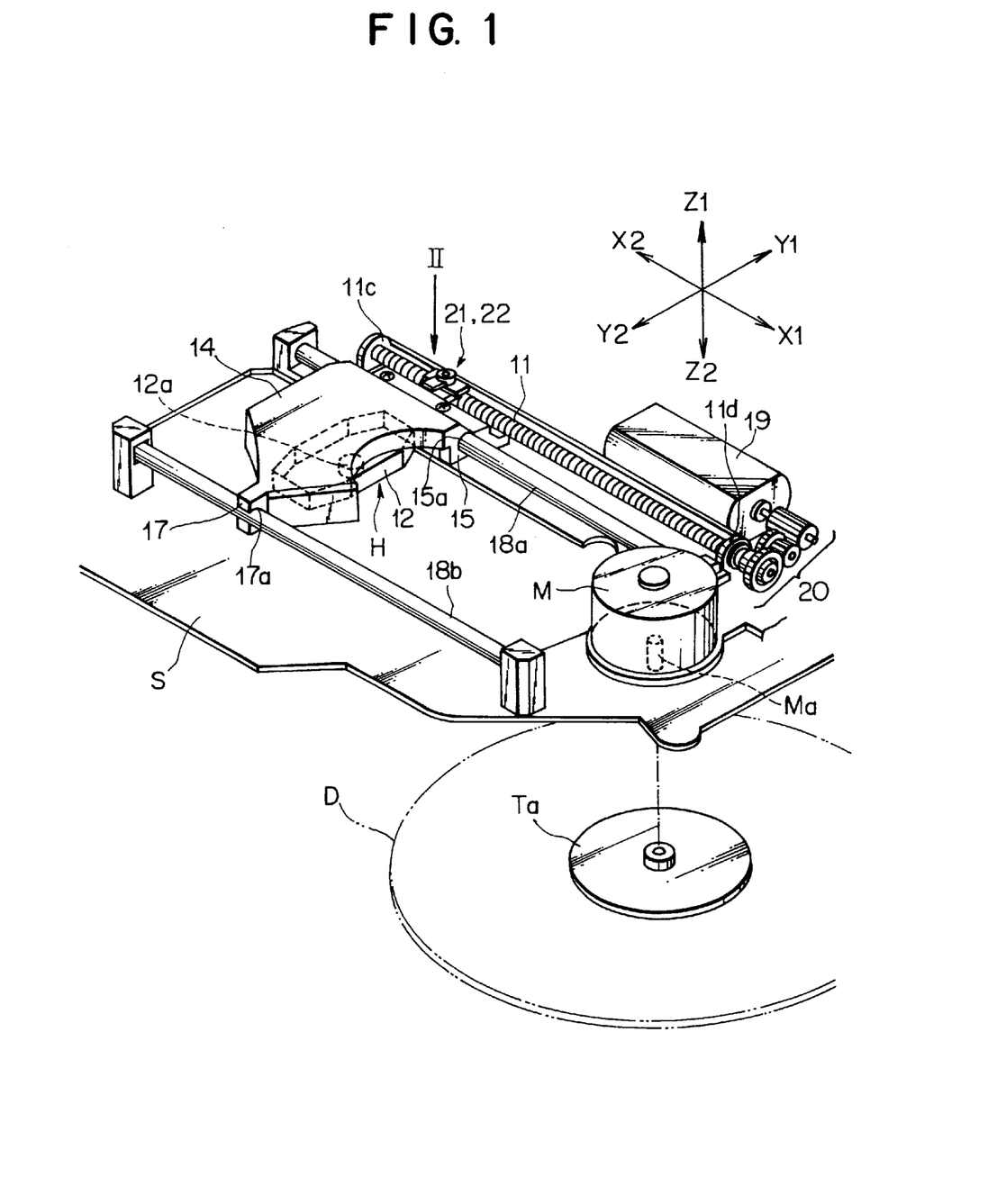
FIG. 1 is a total perspective view illustrating a driving unit with the backside facing upward of a disk drive provided with a head driving device according to the invention.

FIG. 1 is a total perspective view illustrating a driving unit of a disk drive for the digital versatile disk (DVD) that mounts a head driving device according to the invention, with the backside facing upward. As shown in FIG. 1, guide members (guide shafts) 18a, 18b are disposed so as to be in parallel with each other on a chassis S. Between the guide members 18a, 18b, a head unit H is supported which contains an optical head 12 mounted on a head base 14. Inside the optical head 12 are integrated a light emitting device such as a semiconductor laser, an objective lens 12a that condenses light beams from the light emitting device onto the recorded face of a disk D, a light receiving device that receives to detect a return light reflected from the disk D, and the other optical components.

Shaft bearings 15, 16 (refer to FIG. 2) are formed integrally with the head base 14 on one side thereof, and bearing sleeves 15a, 16a are loosely attached in the shaft bearings 15, 16. The guide member 18a is inserted through the bearing sleeves 15a, 16a. A shaft bearing 17 is formed on the other side of the head base 14, which is provided with a U slot 17a. This U slot 17a is engaged with the guide member 18b slidably with a clearance to the direction Y1-Y2 illustrated. Therefore, the head base 14 is slidable on the guide member 18a, 18b in the direction X1-X2 illustrated. Further, the guide member 18a is designed to be inserted through the bearing sleeves 15a, 16a with an extremely minute clearance, and there is hardly any looseness between the guide member 18a and the bearing sleeves 15a, 16a, and yet there is an extremely low friction between the guide member 18a and the bearing sleeves 15a, 16a, so that the head base 14 is able to slide thereon smoothly.

A screw shaft 11 is disposed in parallel to the guide member 18a at a position adjoining to the guide member 18a. Both the ends of the screw shaft 11 are rotatably supported by shaft bearings 11c, 11d fixed on the chassis S. A tracking motor 19 is disposed on X1 side of the screw shaft 11, and the torque of the tracking motor 19 is reduced by reduction gears 20 to be supplied to the screw shaft 11. This embodiment makes up a driving unit that rotates the screw shaft 11 by means of the tracking motor 19 and the reduction gears 20.

Figure 5:
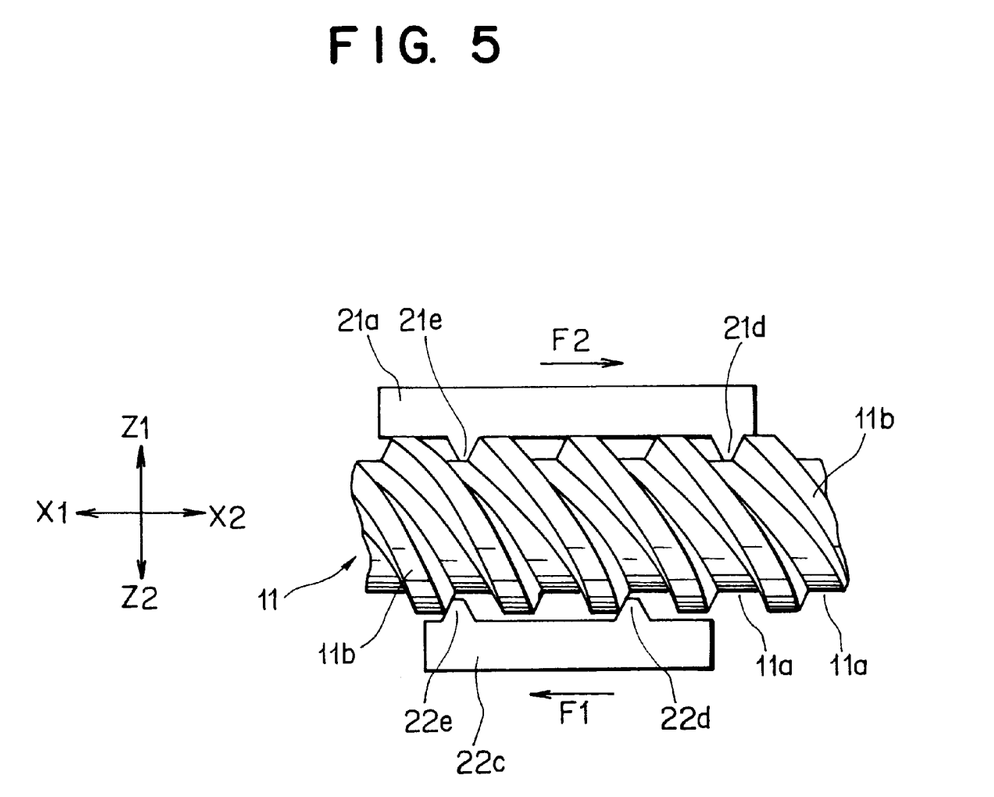
FIG. 5 is an enlarged front view that the head driving device in FIG. 2 is viewed from the direction of the Y2 arrow.

A first engagement member 21 and a second engagement member 22 are provided on the end of Y1 side where the shaft bearings 15, 16 of the head base 14 are placed. The first engagement member 21 and second engagement member 22 are formed of a synthetic resin of which friction coefficient is low. As shown in FIG. 5, two convex threads 21d, 21e are integrally formed on the first engagement member 21, and in the same manner, two convex threads 22d, 22e are integrally formed on the second engagement member 22. The convex threads 21d, 21e, and the convex threads 22d, 22e are engaged with the thread groove (thread root) of the screw shaft 11. The screw shaft 11 is formed into a double-start thread. When the foregoing driving unit drives the screw shaft 11 to rotate, a driving force is exerted to the engagement members 21, 22 in the direction X1 or X2; and the head base 14 is shifted in the radial direction of the disk D on the basis of the guide member 18a.

A spindle motor M is fixed on the chassis S on the X1 side thereof. The motor shaft ma of the spindle motor M passes through the chassis S in Z2 direction. A turn table Ta is attached about the motor shaft Ma on the bottom side of the chassis S. The disk D is designed to be mounted on this turn table Ta.

When the disk D is mounted on the turn table and the reproducing or recording mode is selected, the spindle motor M is driven to rotate the disk D. And, the head driving device comprised of the engagement members 21, 22 and the screw shaft 11 moves the head unit H to the peripheral side (X2 side) from a position facing the TOC area provided on the inside of the recording area of the disk D, and reads out signals on the recording area or writes signals on the recording area.

Figure 2:
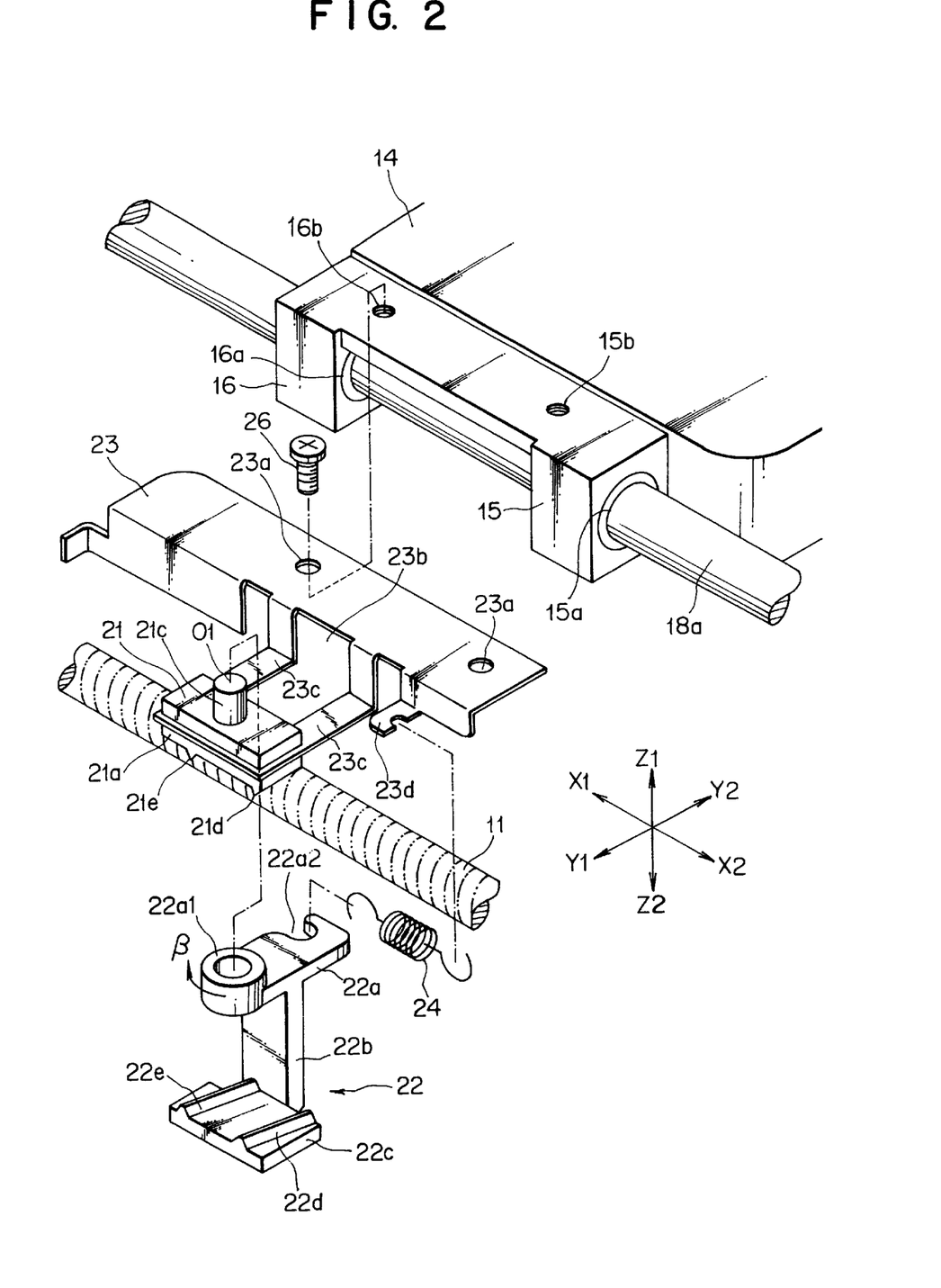
FIG. 2 is an enlarged exploded perspective view that illustrates the head driving device according to the invention, viewed from the arrow II shown in FIG. 1.
Figure 3:
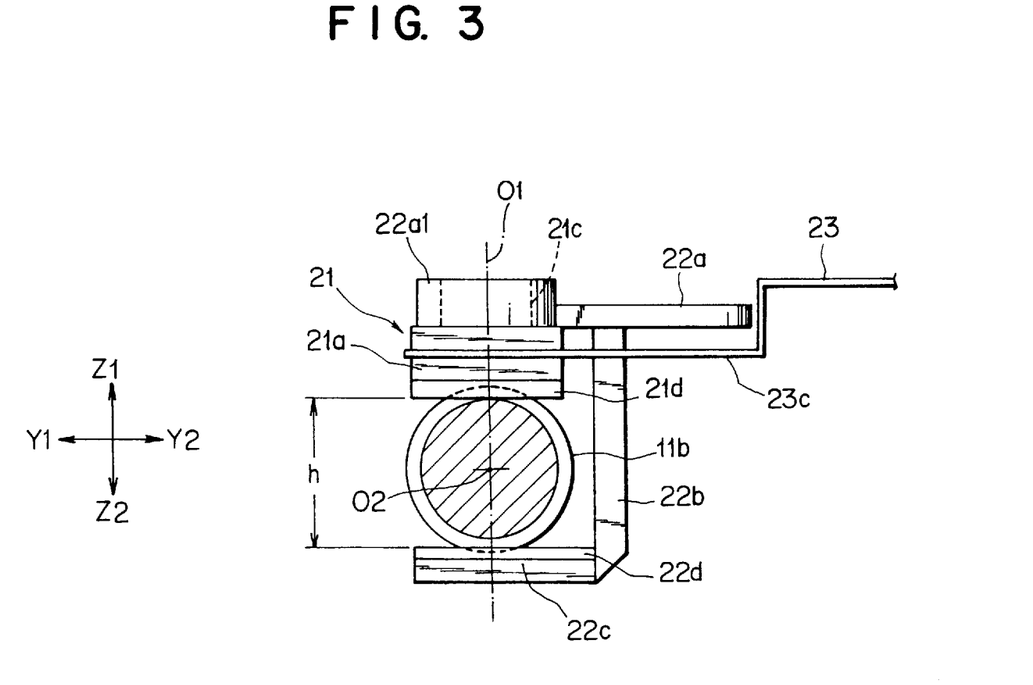
FIG. 3 is an enlarged sectional view illustrating the head driving device in FIG. 2, taken on by the Y-Z plane as the cutting plane.
Figure 4:
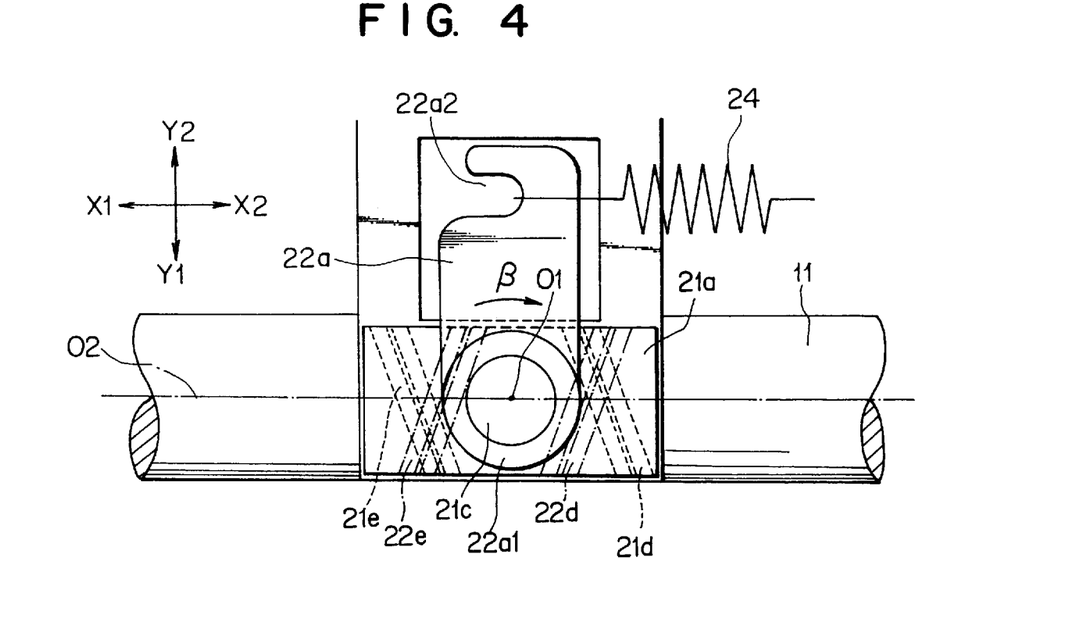
FIG. 4 is an enlarged plan view that the head driving device in FIG. 2 is viewed from the direction of the Z2 arrow.

FIG. 2 is an enlarged exploded perspective view that illustrates the head driving device according to the invention, viewed from the arrow II shown in FIG. 1, FIG. 3 is an enlarged sectional view illustrating a state wherein the head driving device shown in FIG. 2 is assembled, taken on by the Y-Z plane as the cutting plane, FIG. 4 is an enlarged plan view that the head driving device is viewed from the direction of the Z2 arrow in FIG. 2, and FIG. 5 is an enlarged front view that the head driving device is viewed from the direction of the Y2 arrow in FIG. 2.

The head base 14 and the shaft bearings 15, 16 are made, for example, of a metal such as an aluminum alloy, through die casting. A blade spring 23 served as the suppression member is attached on the lower side (upper side in FIGS. 1, 2) of the shaft bearings 15, 16. Screws 26, 26, passing through attachment holes 23a, 23a of the blade spring 23, screw female screws 15b, 16b that are formed on the shaft bearings 15, 16, thereby fastening the blade spring 23 onto the head base 14.

The blade spring 23 is made of a thin metal spring material through press molding. Bent parts extending in Y1 direction are served as arms 23c, 23d. The arm 23 is provided with a rectangular hole 23b formed on the center thereof. The first engagement member 21 is formed of a synthetic resin, and the front end of the arm 23c is buried into the engagement member 21, so that the blade 23 is fastened integrally with the first engagement member 21.

The foregoing two convex threads 21d, 21e are formed with a specific distance on an engaging portion 21a of the first engagement member 21. The convex threads 21d and 21e are formed to tilt against the axial direction (X direction) of the screw shaft 11 with the helix angle of the thread groove (thread root) 11a of the screw shaft 11, or they are formed in a spiral shape so as to coincide with a spiral locus of the thread groove 11a. The screw shaft 11 is formed into a double-start thread, and the foregoing convex threads 21d and 21e are formed with a gap of 1.5 times the pitch of the double-start thread, which are engaged with the thread grooves of the screw shaft 11 each having different locuses.

Further, a spindle 21c is formed on the first engagement member 21 so as to project out in the direction Z1. The center line O1 of this spindle 21c is perpendicular to the center line O2 of the screw shaft 11, and the extension of the center line O1 intersects the center line O2 of the screw shaft 11.

As shown in FIG. 2, the second engagement member 22 includes a rotatable portion 22a, engaging portion 22c, and connecting portion 22b, which are integrally formed of a synthetic resin. The rotatable portion 22a includes a hole 22a1 through which the spindle 21c is rotatably inserted and a hook 22a2 on the other side of the hole 22a1, which are integrally formed on the rotatable portion 22a. While the spindle 21c is rotatably inserted through the rotatable portion 22a, the connecting portion 22b passes through inside the rectangular hole 23b to extend to the direction Z2. And, the engaging portion 22c faces the screw shaft 11 in the opposite direction against the engaging portion 21a of the first engagement member 21.

The foregoing engaging member 22c has the two threads 22d and 22e that are formed integrally. As shown in FIG. 4, the convex threads 22d and 22e are formed, in the same manner as the convex threads 21d and 21e, to tilt against the axial direction (X direction) of the screw shaft 11 with the helix angle of the thread groove (thread root) 11a of the screw shaft 11, or they are formed in a spiral shape so as to coincide with a spiral locus of the thread groove 11a. As shown in FIG. 5, the gap between the convex thread 22d and 22e takes a size equivalent to one pitch of the groove of the double threads of the screw shaft 11, and each of the convex threads 22d and 22e is engaged inside the spiral groove (thread groove) of the same locus of the screw shaft 11.

Between the hook 22a2 of the second engagement member 22 and the hook 23d of the blade spring 23 is stretched an energizing member 24 such as a coil spring. Thereby, the hook 22a2 of the second engagement member 22 continuously receives an energizing force in the direction X2. Accordingly, the second engagement member 22 is energized to rotate in the b direction. Therefore, the convex threads 22d and 22e of the second engagement member 22 located on the lower side in FIG. 5 are suppressed by the energizing force in the direction F1 facing the side of the thread 11b of the screw shaft 11. The convex threads 21d and 21e of the first engagement member 21 located on the upper side in FIG. 5 are suppressed by the energizing force in the direction F2 facing the side of the thread 11b.

The first engagement member 21 and the second engagement member 22 are engaged with the screw shaft 11, while both the engagement members 21, 22 possess the energizing forces F1, F2 each facing the opposite sides in the axial direction of the screw shaft 11. Therefore, the backlash generated between the engagement members 21, 22 and the screw shaft 11 will be absorbed, and the head unit H will not have any backlash when moving in the direction X1-X2. And, even if there are any molding errors in the convex threads 21d, 21e of the first engagement member 21 and the convex threads 22d, 22e of the first engagement member 22, or if a long term use gives a slide wearing to these convex threads, the energizing forces F1, F2 will continue to act on these convex threads in the direction shown in FIG. 5, which will not increase the backlash.

As shown in FIG. 3, the facing gap h between the engaging portion 21a of the first engagement member 21 and the engaging portion 22c of the second engagement member 22 is set by the dimension in combination of both the engagement members 21 and 22. Therefore, if the rigidity of the connecting portion 22b of the second engagement member 22, for example, is sufficiently secured, the facing gap h between the engaging portion 21a and 22c will not widen to exceed the set value. Therefore, if the facing gap h is set to a dimension whereby the convex threads 21d, 21e and the convex threads 22d, 22e do not fall off from the groove 11a of the screw shaft 11, both the engagement members 21 and 22 will not fall off from the groove 11a of the screw shaft 11, with an excessive impact acted on the head unit H in the X direction. Therefore, even if the optical head 12 has such a great weight as one for DVD, the head unit H will not move in the X direction by an impact.

Further, the first engagement member 21 is suppressed in the direction perpendicular to the axial center O2 of the screw shaft 11 by the force of the blade spring 23. However, this suppression force is designed to absorb errors in assembling the guide member 18a and the screw shaft 11 in a specified relative position and errors in the parallelism of both, and a great suppression force is not needed. That is, since the backlash generated between both the engagement member 21, 22 and the screw shaft 11 is absorbed by the elasticity of the forgoing energizing member 24, it is not necessary to suppress the first engagement member 21 to the screw shaft 11 by an excessive force. Therefore, the suppression force by the blade spring 23 will not give a great lateral pressure to the shaft bearings 11c, 11d of the screw shaft 11 so as to increase the rotating load. However, to suppress the first engagement member 21 to the screw shaft 11 by a certain force will further enhance the effect of removing the backlash.

Further, the convex threads 21d, 21e and 22d, 22e slide while being suppressed to each other to the thread 11b of the screw shaft 11 in the X direction. However, since this slide motion is acted on a surface tilted to the F1 and F2 directions of the energizing forces, the rotating load of the screw shaft 11 due to the slide friction is minute.

Further, The center line O1 of the spindle 21c served as the rotary center of the second engagement member 22 is positioned to cross the screw shaft 11 and to intersect the axial center line O2 of the screw shaft 11. Therefore, the engagement members 21 and 22 can be placed in a narrow space, so that the head driving device can be made smaller.

As the invention being thus described, the head driving device according to the invention is able to reduce the backlash generated between the engagement member attached to the head unit and the screw shaft, without giving an excessive rotating load to the screw shaft. And, the engagement member will not fall off from the screw shaft in the axial direction thereof, which provides a head driving device that is immune to an external impact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a head driving device comprising: a head unit guided by a guide member, provided movably along a recording medium; a screw shaft provided along a moving direction of the head unit; a driving unit for providing a torque to the screw shaft; and a spirally engaging member supported by the head unit, spirally engaged with the screw shaft, the head driving device wherein the spirally engaging member includes a first engagement member supported by the head unit and threadingly engaged with the screw shaft at a first angular position about the circumference of the screw shaft, and a second engagement member threadingly engaged with the screw shaft at a second angular position different from the first angular position of the first engagement member, keeping a relatively movable position with respect to the first engagement member; wherein each of the first and second engagement members engage the screw shaft along only a portion of the circumference of the screw shaft; and the spirally engaging member is provided with an energizing member for providing forces each having the opposite direction to the other in the axial direction of the screw shaft to the first engagement member and the second engagement member.

2. A head driving device as claimed in claim 1, wherein the first engagement member are disposed on opposite sides of the screw shaft so as to face each other, and the facing distance between the first engagement member and the second engagement member is set such that both engagement members do not fall off from engagement with the screw shaft.

3. A head driving device as claimed in claim 1, wherein the second engagement member is supported by the first engagement member.

4. A head driving device as claimed in claim 3, wherein the second engagement member is rotatably supported by a spindle extending in a direction perpendicular to the axial direction of the screw shaft, and the energizing member provides a relative rotating force between the first engagement member and the second engagement member.

5. A head driving device as claimed in claim 4, wherein the extension of the center line of the spindle intersects the axial center of the screw shaft.

6. A head driving device as claimed in claim 1, wherein the first engagement member is pressed to the screw shaft in the axial direction of the screw shaft.

7. A head driving device as claimed in claim 6, wherein the first engagement member is pressed to the screw shaft by a blade spring attached to the head unit, and the second engagement member is inserted through a hole formed in the blade spring and is supported by the first engagement member.

8. A head driving device as claimed in claim 1, wherein each of the first engagement member and the second engagement member is provided with at least two convex threads engaged with a thread groove of the screw shaft, and a gap between the convex threads of the first engagement member is not equal in dimension to a gap between the convex threads of the second engagement member.

9. A head driving device as claimed in claim 8, wherein the screw shaft is formed into a double-start thread, the convex threads provided with one of the first and second engagement members engage with a thread groove of one spiral locus of the screw shaft, and the convex threads provided with the other of the first and second engagement members engage with a thread groove of the other spiral locus of the screw shaft.

10. In a head driving device comprising: a head unit guided by a guide member, provided movably along a recording medium; a screw shaft provided along a moving direction of the head unit; a driving unit for providing a torque to the screw shaft; and a spirally engaging member supported by the head unit, spirally engaged with the screw shaft, the head driving device wherein the spirally engaging member includes a first engagement member supported by the head unit and threadingly engaged with the screw shaft, and a second engagement member movably supported by the first engagement member and threadingly engaged with the screw shaft from the side opposite the first engagement member; wherein each of the first and second engagement members engage the screw shaft along only a portion of the circumference of the screw shaft; and the spirally engaging member is provided with an energizing member for providing forces each having the opposite direction to the other in the axial direction of the screw shaft to the first engagement member and the second engagement member.

11. A head driving device as claimed in claim 10, wherein the second engagement member is rotatably supported by a spindle extending in a direction perpendicular to the axial direction of the screw shaft, and the energizing member provides a relative rotating force between the first engagement member and the second engagement member.

12. A head driving device as claimed in claim 11, wherein the extension of the center line of the spindle intersects the axial center of the screw shaft.

13. A head driving device as claimed in claim 10, wherein the first engagement member is pressed to the screw shaft in the axial direction of the screw shaft.

14. A head driving device as claimed in claim 13, wherein the first engagement member is pressed to the screw shaft by a blade spring attached to the head unit, and the second engagement member is inserted through a hole formed in the blade spring and is supported by the first engagement member.

15. A head driving device as claimed in claim 10, wherein each of the first engagement member and the second engagement member is provided with at least two convex threads engaged with a thread groove of the screw shaft, and a gap between the convex threads of the first engagement member is not equal in dimension to a gap between the convex threads of the second engagement member.

16. A head driving device as claimed in claim 15, wherein the screw shaft is formed into a double-start thread, the convex threads provided with one of the first and second engagement members engage with a thread groove of one spiral locus of the screw shaft, and the convex threads provided with the other of the first and second engagement members engage with a thread groove of the other spiral locus of the screw shaft.

17. In a head driving device comprising: a head unit guided by a guide member, provided movably along a recording medium; a screw shaft provided along a moving direction of the head unit; a driving unit for providing a torque to the screw shaft; and a spirally engaging member supported by the head unit, spirally engaged with the screw shaft, the head driving device wherein the spirally engaging member includes a first engagement member supported by the head unit and threadingly engaged with the screw shaft, and a second engagement member rotatably supported by a spindle extending in a direction perpendicular to the axial direction of the screw shaft, threadingly engaged with the screw shaft from the side opposite the first engagement member; wherein each of the first and second engagement members engage the screw shaft along only a portion of the circumference of the screw shaft; and the spirally engaging member is provided with an energizing member for providing rotating forces each having the opposite direction to the other in the axial direction of the screw shaft to the first engagement member and the second engagement member.

18. A head driving device as claimed in claim 17, wherein the first engagement member is pressed to the screw shaft in the axial direction of the screw shaft.

19. A head driving device as claimed in claim 18, wherein the first engagement member is pressed to the screw shaft by a blade spring attached to the head unit, and the second engagement member is inserted through a hole formed in the blade spring and is supported by the first engagement member.

20. A head driving device as claimed in claim 17, wherein each of the first engagement member and the second engagement member is provided with at least two convex threads engaged with a thread groove of the screw shaft, and a gap between the convex threads of the first engagement member is not equal in dimension to a gap between the convex threads of the second engagement member.

21. A head driving device as claimed in claim 20, wherein the screw shaft is formed into a double-start thread, the convex threads provided with one of the first and second engagement members engage with a thread groove of one spiral locus of the screw shaft, and the convex threads provided with the other of the first and second engagement members engage with a thread groove of the other spiral locus of the screw shaft.

* * * * *

UNITED STATES PATENT AND TRADEMARK OFFICE
CERTIFICATE OF CORRECTION

PATENT NO. : 6,058,098
DATED : May 2, 2000
INVENTOR(S) : Kazunari Kato

It is certified that error appears in the above-identified patent and that said Letters Patent is hereby corrected as shown below:

Column 2,
Line 7, under "ABSTRACT", please delete "the" (second occurrence).

CLAIMS

Claim 2,
Line 2, after "member", please insert -- and the second engagement member --.

Signed and Sealed this

Thirty-first Day of July, 2001

*Attest:*

NICHOLAS P. GODICI
*Attesting Officer*  *Acting Director of the United States Patent and Trademark Office*